United States Patent
Kano et al.

(10) Patent No.: US 7,280,949 B2
(45) Date of Patent: Oct. 9, 2007

(54) AIDED DESIGN APPARATUS, AIDED DESIGN METHOD, AND RECORDING MEDIUM FOR RECORDING PROGRAM FOR CARRYING OUT THE METHOD

(75) Inventors: Takashi Kano, Tokyo (JP); Kazuhiko Ishiwata, Chiba (JP); Kazuki Nakanishi, Ibaraki (JP); Kazuhito Watanabe, Chiba (JP); Toshihiko Horikoshi, Ibaraki (JP)

(73) Assignee: Canon Kabushiki Kaisha (JP)

( * ) Notice: Subject to any disclaimer, the term of this patent is extended or adjusted under 35 U.S.C. 154(b) by 610 days.

(21) Appl. No.: 10/720,836

(22) Filed: Nov. 24, 2003

(65) Prior Publication Data
US 2004/0158341 A1 Aug. 12, 2004

(30) Foreign Application Priority Data
Nov. 22, 2002 (JP) ............................. 2002-338740

(51) Int. Cl.
G06G 7/48 (2006.01)
G06F 17/50 (2006.01)
G06F 19/00 (2006.01)

(52) U.S. Cl. .............................. 703/7; 700/97; 700/98; 703/1

(58) Field of Classification Search .................. 700/97; 703/7
See application file for complete search history.

(56) References Cited

U.S. PATENT DOCUMENTS 5,838,596 A * 11/1998 Shimomura et al. ........... 703/6

7,119,805 B2 * 10/2006 Batori et al. .................. 345/419

FOREIGN PATENT DOCUMENTS

| JP | 05-314225 A | 11/1993 |
|---|---|---|
| JP | 06-103345 A | 4/1994 |
| JP | 11-116133 A | 4/1999 |
| JP | 2000-250954 A | 9/2000 |
| JP | 2000-331037 A | 11/2000 |
| JP | 2001-84018 A | 3/2001 |
| JP | 2001-099880 A | 4/2001 |
| JP | 2002-140372 A | 5/2002 |

OTHER PUBLICATIONS

Yoneda et al., "An Optimization-Based Production Scheduling System Progress Report" IEEE 1996 p. 2387-2388.*
Horikoshi et al., "3-D Shape indexing Language" IEEE 1990 p. 493-499.*
Jones et al., "Simulation of a Lineboard Paper Machine Project 3471 Report 5" 1992 Institute of Paper Science and Technology. p. 1-74 with appendicies A-1 to A-44.*

* cited by examiner

Primary Examiner—Anthony Knight
Assistant Examiner—Thomas H. Stevens
(74) Attorney, Agent, or Firm—Rossi, Kimms & McDowell LLP

(57) ABSTRACT

The invention provides an aided design apparatus including a output element for outputting data of an attribute name associated with an attribute group of a part used for transporting a sheet along with three-dimensional shape data of the part. The invention further provides a related aided design method and a recording medium for recording a program for carrying out the method, wherein the data of parts used in a simulation for paper transportation can be easily exchanged.

21 Claims, 17 Drawing Sheets

Fig. 3

| ATTRIBUTE GROUP | | | ATTRIBUTE NAME | OUTPUT DESTINATION |
|---|---|---|---|---|
| TRANSFER GUIDE | | | MATERIAL (FRICTIONAL COEFFICIENT) | SIMULATOR1 |
| TRANSPORT ROLLER | FIXING ROLLER | | PRESSING FORCE | SIMULATOR1, SIMULATOR3 |
| | TRANSFER ROLLER | | DRIVING CONDITIONS | |
| | TRANSPORT ROLLER | | FRICTIONAL COEFFICIENT | |
| | GUIDE ROLLER | | INERTIA | |
| FILM GUIDE SUCH AS POLYESTER FILM | | | MATERIAL (YOUNG'S MODULUS) | SIMULATOR2, SOFTWARE DESIGN1 |
| | | | MATERIAL (FRICTIONAL COEFFICIENT) | |
| FLAPPER | | | DRIVING CONDITIONS | SIMULATOR2, SOFTWARE DESIGN2 |
| SENSOR | | | DRIVING CONDITIONS | SIMULATOR1 |
| PAPER PATH (TWO-DIMENSIONAL INFORMATION) | | | PATH LENGTH | SIMULATOR4 |

Fig.5A

| GUIDE PLATE | |
|---|---|
| PART NAME | guide2 |
| FLAG | True |
| MATERIAL | ABS |
| FRICTIONAL COEFFICIENT | 1.1 |

| | |
|---|---|
| ABS | 1.1 |
| POM | 1.2 |
| SUM23L-B | 1.5 |
| PC+ABS | 1.8 |

MATRIAL
ABS
POM
SUM23L-B
PC+ABS
...

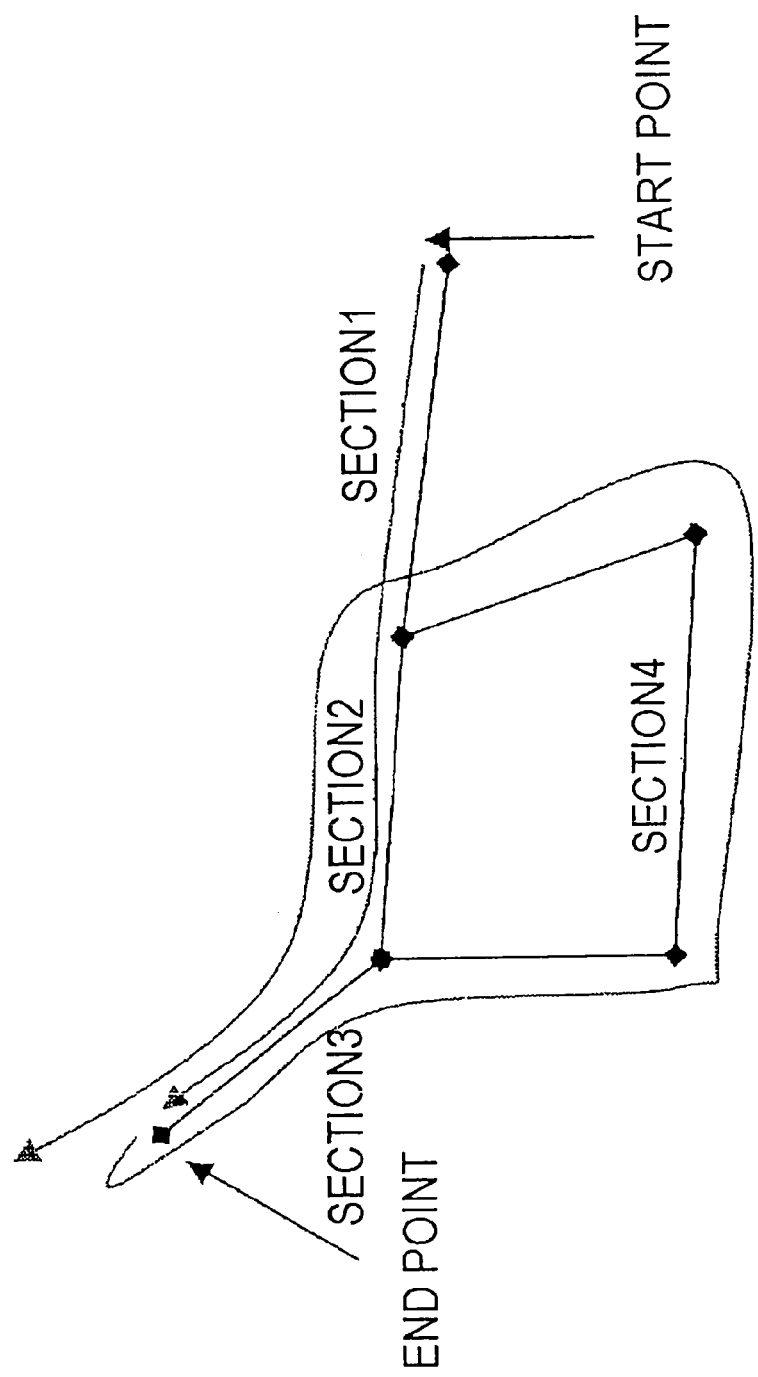

Fig.13

```
*[ROLLER INFOMATION]
*PART NAME,CENTER POSITION, RADIUS, MATERIAL
roller1,"10,10",10.5,ABS
roller12,"20,10",15.5,ABS
roller13,"110,10",20.5,ABS
roller14,"310,10",30.5,ABS

*[GUIDE PLATE INFORMATION]
*Line or Arc or Spline START POINT, END POINT, CENTER (ARC)
LINE,"10.5,10.5","100.0,100.0"
ARC,"5,10","30,40","10.0.10.0"
...

*[PAPER PATH INFORMATION]
*PAPER PATH ELEMENT
0 SPLINE
    END_L -90.011489920340438,-55.457774430023193
    END_R -67.634677809124952,85.34802967677652
    LENGTH 153.85250668527772
1 ARC
    END_L -67.634677809124938,85.34802967677652
    END_R -69.43395492034044,101.4842875699768
    CENTER -268.77219671991821,-75.708134430023193
    LENGTH 16.252763377358612
2 ARC
    END_L -69.43395492034044,101.4842875699768
    END_R -75.877104920340429,108.76784756997679
    CENTER -175.88930454618531,-75.708134430023193
    LENGTH 10.204557248071362
...

*ORDER OF PAPER PATH ELEMENTS
1,2,3,4, ...
```

AIDED DESIGN APPARATUS, AIDED DESIGN METHOD, AND RECORDING MEDIUM FOR RECORDING PROGRAM FOR CARRYING OUT THE METHOD

BACKGROUND OF THE INVENTION

1. Field of the Invention

The present invention relates to an aided design apparatus, an aided design method, and a recording medium for recording a program for carrying out the method, which utilize three-dimensional CAD data or the like to allow an efficient simulation of transportation of a sheet-like member such as paper or film in a copying machine, a laser beam printer, an inkjet printer, a card printer, a facsimile machine, or the like.

2. Description of the Related Art

Recent improvements in the performance of computers have resulted in a rapid shift of CAD (computer aided design) used for machine designing tasks from two-dimensional CAD to three-dimensional CAD. Further, it has recently become common to verify, using a simulator, the design of a machine using three-dimensional CAD data created before the fabrication of the machine.

For example, in designing an apparatus such as a copying machine, a laser beam printer, an inkjet printer, a card printer, or a facsimile machine, in which a sheet-like member such as paper or film is transported, it is desired to verify a design for transporting the sheet-like member (hereinafter referred to as "paper transport design") before the apparatus is actually fabricated.

When a paper transport design is verified, the designer models a paper transport system unit on a three-dimensional CAD basis and defines a principal section of the paper transport system units and cuts a section of the paper transport system units to create a two-dimensional drawing on the section. Thereafter, the drawing is added with parameters required to simulate paper transportation such as those associated with a paper transport path, a sensor, a transport roller, a transport guide, a film guide such as polyester film, and a flapper. Then, the designer passes the created drawing to persons in charge of various types of analysis as design information.

An actual simulation or analysis of paper transportation is carried out after inputting the shapes of the transport guide, transport roller, and so on again on a simulation program based on the passed drawing (design information) and defining parameters such as the material of the transport guide and a pressing force of the transport roller as attributes of them. The person in charge performs the simulation of paper transportation based on the input information, evaluates analysis results, and provides the designer with feedback of the analysis results to allow evaluation of the functions of the unit.

Alternatively, a simulation of paper transportation may be carried out by outputting three-dimensional shape information in the form of an intermediate file according to STEP (standard for the Exchange of Product Model Data) or IGES (Initial Graphic Exchange Specification) from a three-dimensional CAD apparatus and by using the output data instead of using a drawing as described above.

In this case, the shape information is first passed to a simulator using a data conversion format, and parameters required for analysis such as the pressing force of the roller, the paper pass path, the material of the transport guide plate, and sensor characteristics (delay and chattering) are thereafter individually defined on the simulator. Alternatively, attribute values that depend on materials may be checked on and input from a parameter reference table (which shows materials and frictional coefficients thereof or materials and Young's modulus thereof, for example). A simulation is thereafter performed, and results of transportation analysis are obtained.

As an example of this approach, Japanese Patent Application Laid-Open No. 2001-84018 discloses an aided design apparatus having a mechanism for simultaneously exchanging shape information and processing information with a CAM (Computer Aided Manufacturing) program, in which model data associated with manufacturing processes on a surface or specifications of the surface are provided in the form of color attributes. However, Japanese Patent Application Laid-Open No. 2001-84018 discloses nothing about exchange of data relating to various parameters required for a simulation of paper transportation.

In three-dimensional CAD, shapes and attributes may be managed by using the shapes as modeling tools and using a management tool, which is a separate tool in general, for the attributes. The management tool is a so-called PDM (Product Data Management) system with which all information associated with designing and development of an industrial product is managed on a centralized basis at steps for developing the product to improve efficiency of the steps and to reduce the period of the development. The system is configured to primarily provide functions such as management of data associated with designing including drawing data such as CAD data and document data such as specifications and cooperation between management of configuration data of components of which the product is made up and a purchasing and inventory system and work-flow management for allowing understanding of designing and production schedules and improving the efficiency of those tasks. The system allows centralized management of all information associated with the product.

However, the above-described technique according to the prior art still has many problems to be solved in order to verify effectiveness of a design of a paper transport system unit through a simulation without actually fabricating the machine. Further, it is not appropriate to say that simulations based on design data thus created have been effectively conducted up to the present.

For example, in order to analyze the quality of a design of a transport system and problems with the same, it has been necessary to convert information input on a three-dimensional CAD basis into two-dimensional CAD information temporarily, to select parts and elements associated with the transport system based on the converted two-dimensional CAD information thereafter, and to construct a simulation based on required members thus selected.

Further, much man-power and time is required to understand which part shapes are associated with a transport system from complicated drawings whether they are on a three-dimensional CAD or two-dimensional CAD basis. In addition, one must be highly skilled in transport systems to be able to select those shapes.

Therefore, in order to conduct an accurate simulation in a short time, a problem to be solved remains in that such a simulation depends on the ability of the person in charge of the task and takes much time.

The use of an intermediate file for data conversion allows shape data to be accurately passed to a simulator without creating a two-dimensional drawing. However, there is no intermediate file format that can be commonly used for exchange of parameters required for verification on a simulator such as the material of a transport guide and the pressing force of a roller.

Therefore, while the shapes of members and elements can be passed to a simulation program, parameters of the respective elements must be separately defined and input on the simulator.

Improvements are therefore still needed in that the definitions and inputs can be different from intentions of the designer and in that condition setting can become complicated with an increased possibility of setting errors when the elements are related to each other in a complicated manner, although the complication is not so severe in the case of a simple transport system.

Further, information on solid-state properties such as frictional coefficients must be defined during the simulation by referring to a table of correspondence between materials and frictional coefficients which has been obtained through experiments, which has resulted in similar errors in reading values and has involved man-hour required for making reference as well.

In addition, when there is an error in inputting a parameter, simulation and analysis results that are completely different from the reality can be returned to the designer, which has resulted in a possibility of a design reflecting unnecessary considerations (over-fulfillment of specifications) or a possibility of designing and manufacture of a machine which does not satisfy the specifications in practice. This could result in an increase in the manufacturing cost or a tremendous cost to recover the failure.

When a simulation is attempted again after a design change, a problem has arisen in that parameters must be redefined on the simulator after performing the shape converting operation.

In the case of an appropriation of a design, while shape information which has been modeled for the previous type of the machine can be diverted, parameters are not managed along with the shape information on a centralized basis. This has resulted in a need for checking the parameter values of the previous type of the machine after conversion of a shape file or picking up each of the values from experimental data again. In either case, it has been necessary to redefine required information.

When a designer of the mechanism of a paper transport system attempts to transfer mechanical information to a software developer such as a firmware designer, if the software developer has no mechanical CAD, the mechanical information must be transferred by creating a two-dimensional drawing in the same way as described above and outputting it on paper using a printer or plotter. In this case, since a software developer such as an engine firmware designer reads the information from the two-dimensional drawing thus created on paper, there is a high possibility that a long time is spent before parts constituting a unit are understood; errors occur in reading dimensions in the drawing; and definition errors occur. This has resulted in the possibility of a reduction in efficiency and a cost increase.

Furthermore, simulators associated with paper transport systems on the market take various forms depending on their purposes and applications, e.g., observation of behavior of paper taking the solid-state properties of the paper and the solid-state properties of a transport guide into consideration and checking of sequence control over paper transportation in cooperation with a control tool. This results in a need for changing input parameters and for inputting various parameters for each simulation program depending on the purpose and application.

As a result, simulator parameters values must be separately managed and input on each of simulator programs even when they serve the same paper transport unit, which has sometimes caused problems with maintainability of the parameters.

The above-cited Japanese Patent Application Laid-Open No. 2001-84018 discloses a CAD/CAM apparatus invented to solve problems that occur in the aspect of transfer of design information. In the disclosure, design information is passed to the CAM using a color attribute as a key instead of passing a parameter directly. Specifically, a color conversion table is provided to store information that each color means, and the CAM interprets information added by a design by finding a match between the table and the color attribute serving as a key.

Therefore, the color table is always required when a color attribute is passed from one system to another, and the meaning of the color attribute cannot be understood and transferred as accurate information without the color table.

The variety of input contents increases with the number of parameters, which has resulted in the possibility that an input cannot be rendered using only the color table.

Obviously, Japanese Patent Application Laid-Open No. 2001-84018 only describes that only model data which are associated with a manufacturing process performed on a surface or the specifications of the surface are added as color information.

Another possible approach is to employ PDM to manage parameters values for analysis and to connect a simulator to the system for cooperation. However, problems may be caused by straightforward introduction of PDM in practice because it results in a cost increase from the viewpoint of capital investment; the system becomes complicated as a whole; and designers and evaluators may conduct complicated operations and management.

SUMMARY OF THE INVENTION

This invention is made in view of the above-described problems in the related art, and it is an object of the invention to provide an aided design apparatus, an aided design method, and a recording medium for recording a program for carrying out the method, with which data of parts used in a simulation for paper transportation analysis can be easily exchanged.

In order to achieve the above object, the invention provides an aided design apparatus characterized in that it has a data output unit for outputting data of an attribute name associated with a group of attributes of a part used for transportation of a sheet along with three-dimensional shape data of the part.

Other objects and features of the invention will become apparent from the following description and the accompanying drawings.

BRIEF DESCRIPTION OF THE DRAWINGS

FIG. 3 is a table for explaining examples of attribute groups and attribute names according to the invention;

FIGS. 5A and 5B illustrate an example of a configuration of display at an input section;

FIGS. 10A to 10C are illustrations for explaining an example of a flow of processes for defining a regular paper path for path elements divided at step ST6 in FIG. 1;

FIG. 13 is an illustration for explaining an example of a file output at step ST10 in FIG. 1.

DESCRIPTION OF THE PREFERRED EMBODIMENTS

A preferred embodiment of the invention will now be described in detail by way of example with reference to the drawings. It is not intended to limit the scope of the invention to configurations disclosed in the present embodiment unless any limiting statement is made.

(Applicable Apparatus Configuration)

Figure 2:
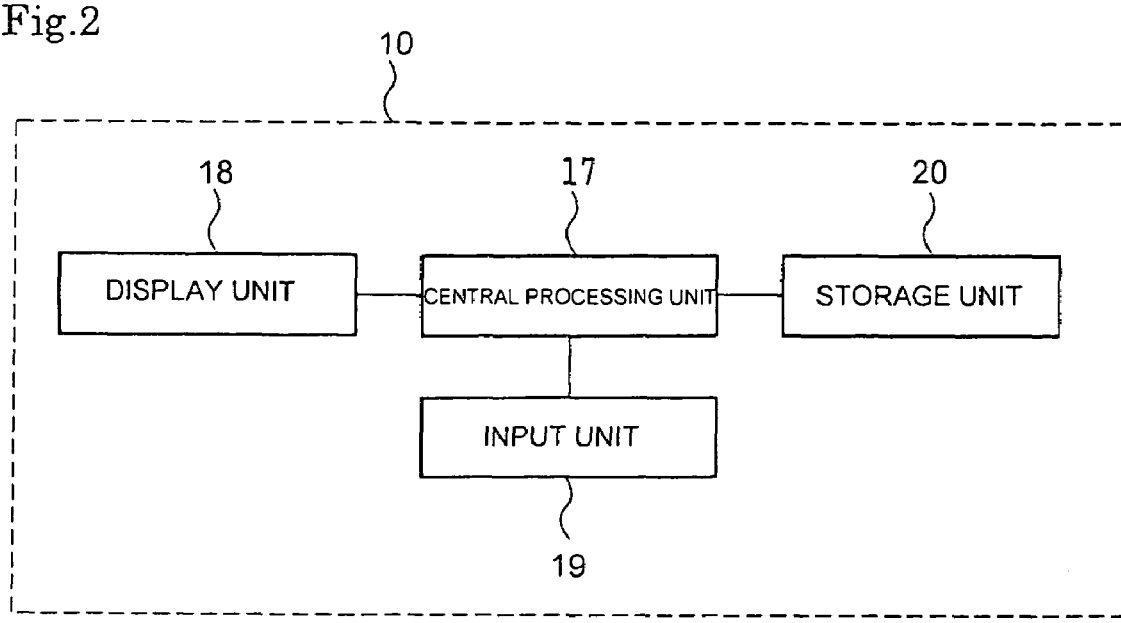
FIG. 2 is a block diagram showing a schematic configuration of an information processing system (CAD) as an aided design apparatus used in embodiments of the invention.

FIG. 2 is a block diagram showing a schematic configuration of an information processing system (CAD) as a three-dimensional aided design apparatus according to the present embodiment for explaining a preferred example of the same.

As shown in FIG. 2, an information processing system 10 is generally comprised of a central processing unit (CPU) 17, a display unit 18, an input unit 19, and a storage unit 20. In the information processing system 10 shown in FIG. 2, the central processing unit (CPU) 17 executes a process such as inputting of parameters and shapes input thereto according to instructions input from the input unit 19, and the display unit (display) 18 displays three-dimensional shapes according to the process, displays input information (various parameters and path information) and displays particulars in progress of the process.

The input unit 19 includes a keyboard, a mouse, a pointing device, or the like, and it is a unit which allows specification information required for operations to be provided, allows information to be input, and allows an instruction for a selection from a menu or other instructions to be given and the like. Alternatively, the unit allows such information and specification information to be input.

Information such as a program for inputting and outputting parameters and data associated with a three-dimensional model is stored in the storage unit 20. The information processing unit 10 includes the above-described units as major parts of the same.

The storage unit 20 includes a ROM (read only memory), a RAM (random access memory), a HDD (hard disk drive), and at least one of various external storage device that are provided separately.

In the information processing system 10, a printer (not shown) for outputting information displayed on the display unit 18 on paper may be connected to the central processing unit 17 to which other peripheral devices may be connected as occasions demand. Referring to the hardware configuration of the information processing system 10, it is not required to be a dedicated apparatus, and a common computer system such as a personal computer may be used.

In the present embodiment, the input/output program, a display model, shape data are stored in the storage unit 20 that utilizes a semiconductor RAM, a magnetic disk, or the like; the specification information required for operations are specified using the input unit 19; results of operations are displayed on the display unit 18; and various parameter and model data can be saved in the storage unit 20.

(Explanation of Operations of the Aided Design Apparatus)

Figure 1:
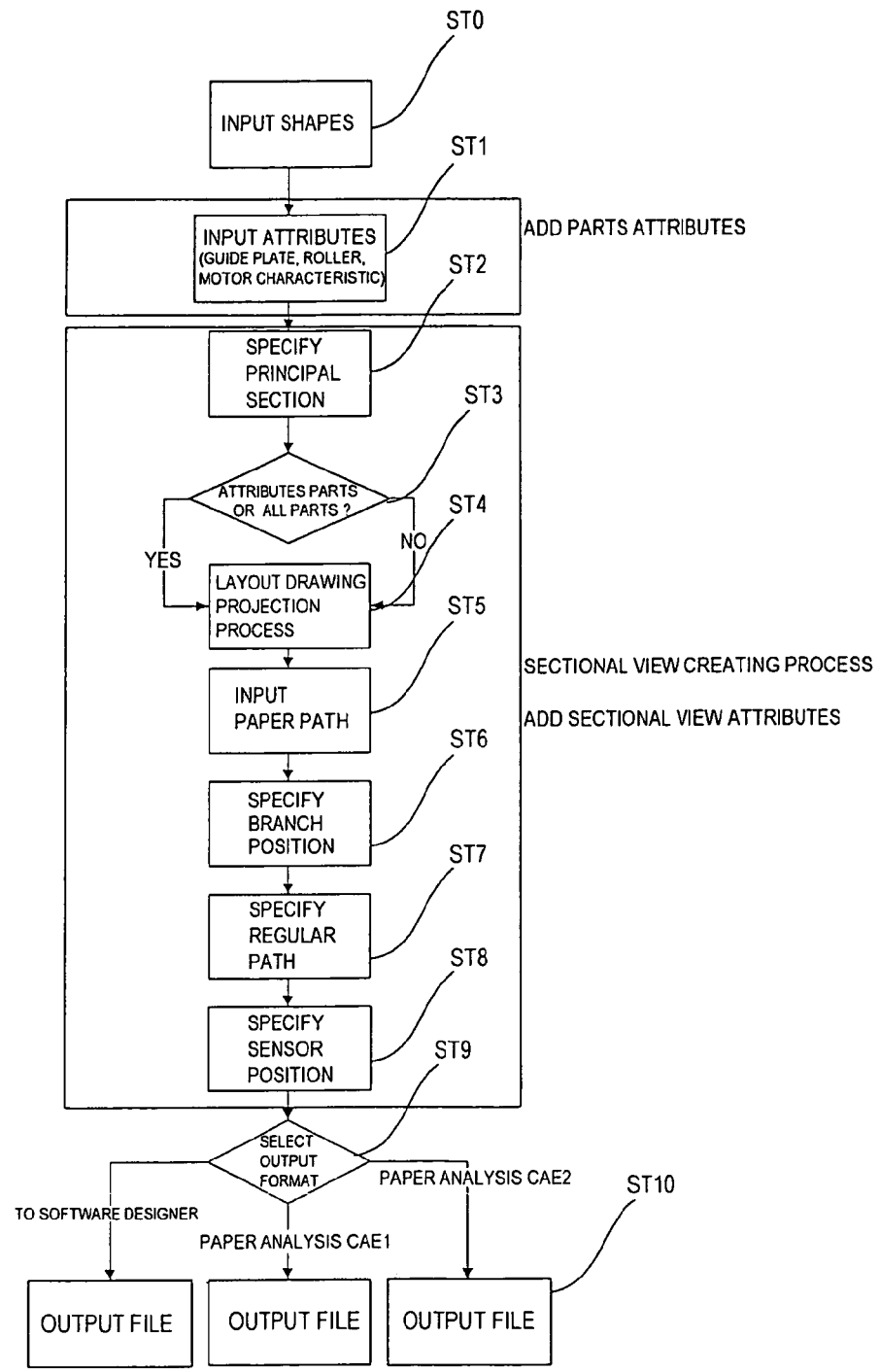
FIG. 1 is a flow chart schematically showing an operation of an aided design apparatus of a first embodiment of the invention.

A preferred example of an operation of the aided design apparatus of the present embodiment will now be described with reference to the flow chart in FIG. 1. FIG. 1 is a flow chart schematically showing an operation of the paper transportation designing apparatus of the present embodiment.

At step ST0, shape data representing profiles of parts that constitute a paper transport system unit are input using the input unit 19.

At step ST1, attribute groups to which the parts constituting the paper transport system unit belong (e.g., a transport guide, a transport roller, and a flapper) are input using the input unit 19.

At step ST2, a principal section is defined using the input unit 19 in a three-dimensional space of the paper transport system unit created based on the shape data input at step ST0.

Next, sectional shapes of the paper transport unit are then calculated at step ST3 as the occasion demands using the defined principal section. For example, parts to be projected on the section are selected, i.e., only parts having paper transport attributes that are the rollers and the guide plates or all parts that appear on the section are selected, and information for acquiring the sections is input using the input unit 19. While it is obvious that the sections to be acquired may be individually specified or may be specified in the form of regions where they are located, they can be input using the input unit 19 in either case.

At step ST4, sectional views are projected on the principal section using the method specified at step ST3.

At step ST5, a paper path is input relative to the sectional views on the principal section using the input unit 19. The path may be input by a designer such that it extends between the guide plates on the two-dimensional principal section.

At step ST6, when the paper path defined at step ST5 includes a loop path, the branch position is specified using the input unit 19, for example a mouse. When there is no loop path and hence there is no need for setting a branch position, process may proceed to the next step without any action.

At step ST7, the order of sections of paper path through which the paper flows are defined using the input unit 19.

When it is required to provide a sensor for judging passage of the paper when the paper flow though the paper path, it is defined at step ST8 whether points for turning the sensor on and off are set in coordinates on the path. When there is a plurality of sensors, the respective points are defined using the input unit 19.

Two-dimensional attributes associated with the paper path are added to the sectional views defined through the above-described steps ST2 to ST8.

At step ST9, the format of an output destination is selected using the input unit 19.

At step ST10, attributes attached to component members such as parts and attributes attached to the sections are retrieved and extracted in accordance with the format selected at step ST9 and are output in predetermined forms as external files.

As thus described, in the present embodiment, parts that constitute a paper transport system unit are modeled; parameters that can be defined for parts are provided as parts attributes; and parameters that are preferably two-dimensional information are provided as attributes of sectional views in the form of two-dimensional information. Thus, only required information can be output by selecting a form of output depending on the entity to which the data are to be passed.

(Details of Addition of Parts Attributes)

In regard to the input of attributes at step ST1 in FIG. 1, examples of attribute group items and attribute names will now be described with reference to FIG. 3. FIG. 3 shows an example of categorization of attribute groups associated with paper transportation and typical attribute names thereof.

In FIG. 3, there are six general categories of attribute groups associated with paper transportation, i.e., the transport guide, transport rollers, film guide such as polyester film, flapper, sensor, and paper path. Attribute names and output destinations are determined for each of the attribute groups.

Attribute names set in the illustrated example are: pressing force, driving conditions, frictional coefficient, and inertia for the transport rollers; material (Young's modulus) and material (frictional coefficient) for the film guide such as polyester film; driving conditions for the flapper; driving conditions for the sensor; and path length for the paper path (two-dimensional information). Referring to output destinations, a simulator 1, a simulator 2, a simulator 3, a simulator 4, a software design division 1, and a software design division 2 are defined for respective objects of simulation.

Figure 4:
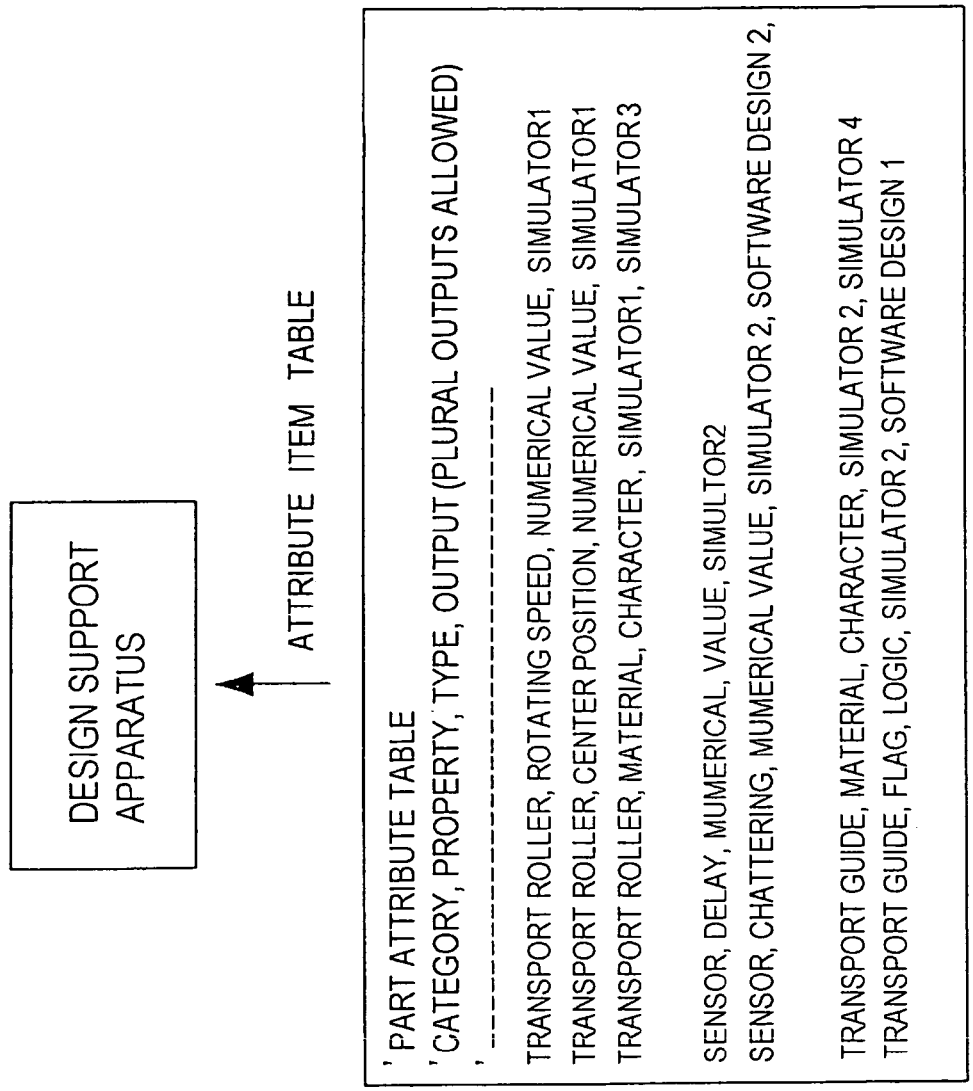
FIG. 4 schematically illustrates a flow pf data defining parts attributes at step ST1 in FIG. 1.

FIG. 4 shows a data flow chart for explaining an example of a flow of data.

FIG. 4 shows an example of an attribute item table (attribute definition means) for defining attribute names to be added to attribute groups such as parts and surfaces (two-dimensional information) for the aided design apparatus.

The attribute item table shows attribute groups to be added to parts, their attribute names and types (character string type or numerical value type), and simulators as output destinations. A mechanism is provided in which a plurality of output destinations are defined for an attribute group in advance and in which the value of the attribute name of the same is output to an external file when an output destination specified by a user matches a defined output destination. The user creates the attribute item table before adding an attribute name to each part or surface using the aided design apparatus to decide attribute names to be added to respective parts in advance before they are added at step ST1.

In some cases, when the value of a defined attribute name is decided, the values of other attribute names are also decided. Specifically, when a material is decided, a frictional coefficient is also decided. In such a case, those values can be simultaneously output by referring to an attribute-parameter table (parameter calculation means) at the time of output.

Attribute groups such as parts and surfaces are input at step ST1 in FIG. 1 using the above-described mechanism with which items can be added to and deleted from the attribute item table only by making a correction to the same and which allows changes to be made in attribute names that can be defined on a system with increased flexibility. For example, when a new attribute name is to be added, the attribute item table can be updated by adding one line on the table to enter the new attribute name additionally and by reloading the table into the aided design apparatus.

As verification during designing becomes more sophisticated, the number of paper transportation simulators increases, and the number of items of attribute names to be added to parts gradually increases. It is possible to increase the number of attribute names that can be added to parts by making an addition to the table shown in FIG. 3 and loading the resultant attribute item table into the aided design apparatus, which facilitates the maintenance of attribute names carried out by a user.

When the designer decides the material of the guide plate that is one of attribute names of the same as indicated in the screen shown in FIG. 5A, the above-described parameter calculation means allows its frictional coefficient to be checked on the aided design apparatus. For example, when material is selected from the table, by referring to material-frictional coefficient database and, at the same time, frictional coefficient is automatically input. It is therefore possible to decide the material of the guide plate while checking the value of the frictional coefficient that is a very effective index for the selection of the material, when the guide plate material is selected.

(Details of Input Screen for Adding Part Attributes)

Figure 5B:
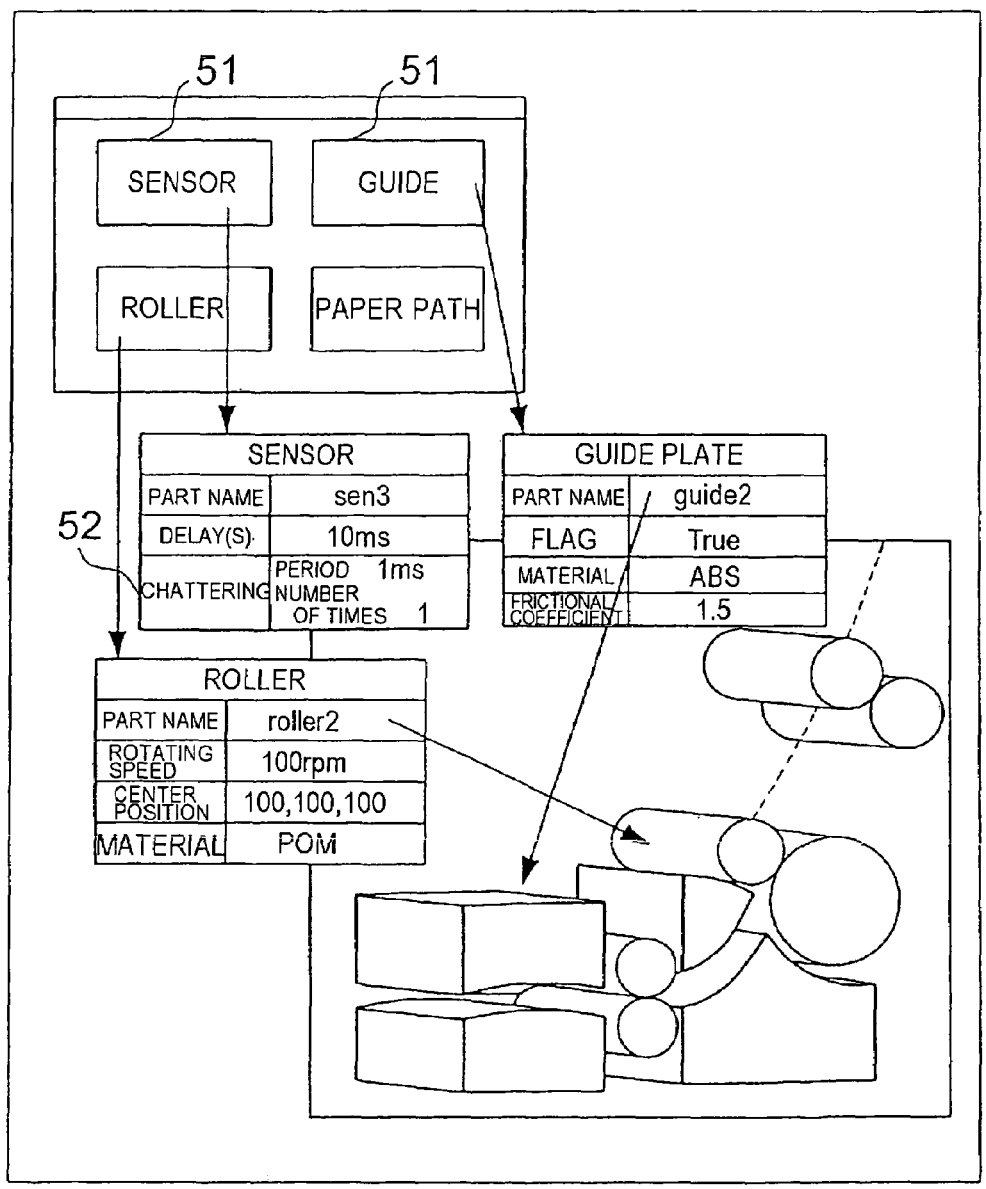

FIG. 5B illustrates a preferred example of an input screen for defining attribute groups for parts.

As shown in FIG. 5B, attribute groups are decided in advance, and buttons 51 are added in the number of the attribute groups. FIG. 4 shows an example of an attribute table. Attribute names associated with delay and chattering are defined as driving conditions for a sensor. As shown in FIG. 5B, a press on the button 51 for the sensor, a field for inputting chattering and delay appears.

That is, the buttons 51 provided are added, corrected, or deleted depending on the number of items whose categories have been input. Similarly, input fields 52 are added to, corrected in, or deleted from the button 51 in each category depending on the number of defined attribute names. Parts to which respective attribute groups are to be added are specified by picking the relevant three-dimensional models on the three-dimensional CAD using the mouse of the input unit 19, and other attribute groups are input using the keyboard of the input unit 19 as attribute groups of parts. The maintenance of the attribute groups for the sectional views can be carried out by making additions, corrections, or deletions using the same method.

(Details of Creation of Sectional Views and Addition of Sectional View Attributes)

Figure 6:
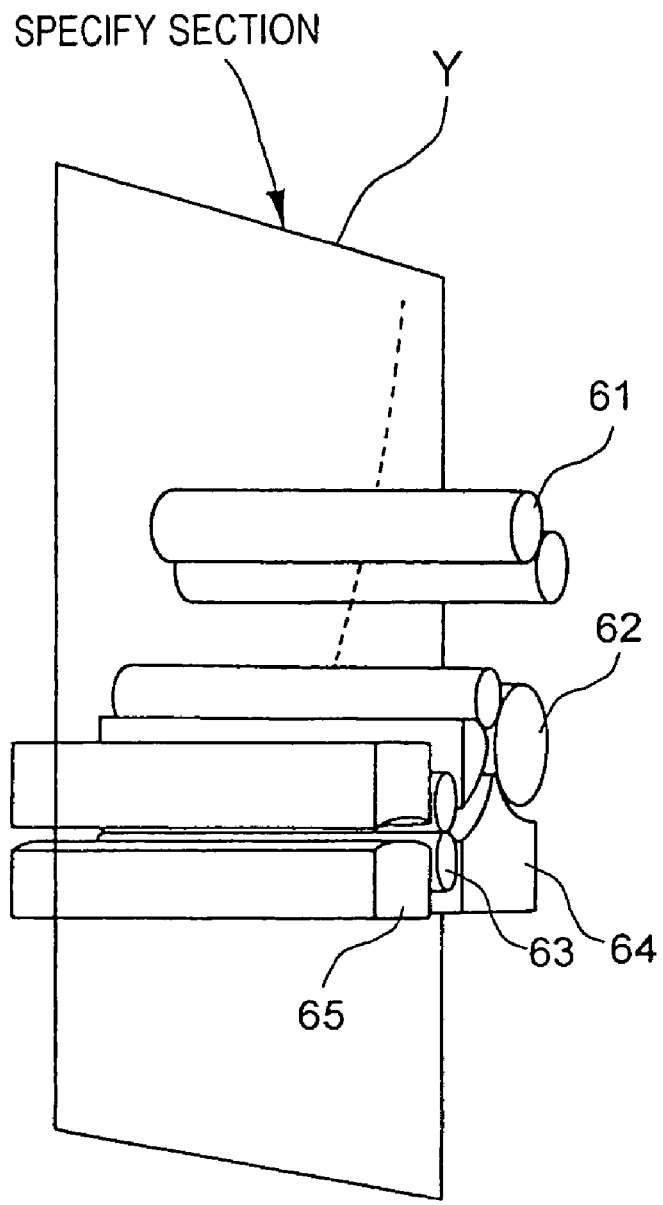
FIG. 6 illustrates an example of a display screen for defining a principal section of a unit in a paper transport system at step ST2 in FIG. 1.

FIG. 6 is an illustration for explaining an example of how to define a principal section of the paper transportation system unit at step ST2 in FIG. 1.

FIG. 6 shows how a two-dimensional principal section Y is defined in the three-dimensional space and displayed on the screen. The principal section Y is defined such that it is perpendicular to the longitudinal direction of a transport roller 61 and such that it includes the position of the center of the transport roller 61. Alternatively, it may be adjusted as occasion demands such that it includes a position that is shifted from the above-described position a specified distance in the longitudinal direction.

At step ST3 in FIG. 1, a selection is made on whether to project other parts (e.g., machine screws and exterior components) which are not associated with the paper transportation system unit on the principal section or to project only parts which are associated with the paper transportation system unit and whose part flags are on, the later parts including the transport guides, transport rollers, film guide such as polyester film, flapper, and sensor that are attribute groups defined at step ST1 in FIG. 1.

This makes it possible to obtain required sectional views easily. Obviously, it is preferable that the selection can be carried out by specifying the members separately, and it is also preferable that the selection can be carried out only in a predetermined region.

An element to be shown in section may be selected by combining selected parameters. It is preferable to provide ability to select or unselect a desired portion by combining those parameters.

Figure 7:
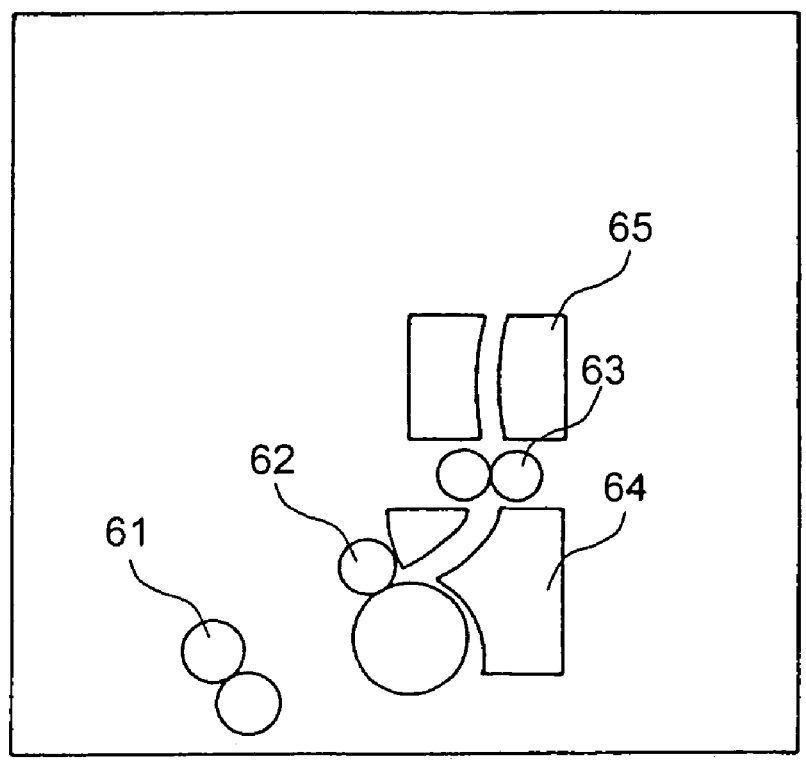
FIG. 7 is an illustration of an example of a display screen showing the principal section after a projection process at step ST4 in FIG. 1.

FIG. 7 is an illustration showing an example of how the principal section appears after the projection process is performed at step ST4 in FIG. 1. By way of example, only required parts, e.g., transport roller pairs 61, 62, and 63 and transport guide pairs 64 and 65 are projected here by specifying the attribute groups of the projected parts. This makes it possible to reduce the complexity of the drawing.

Figure 8:
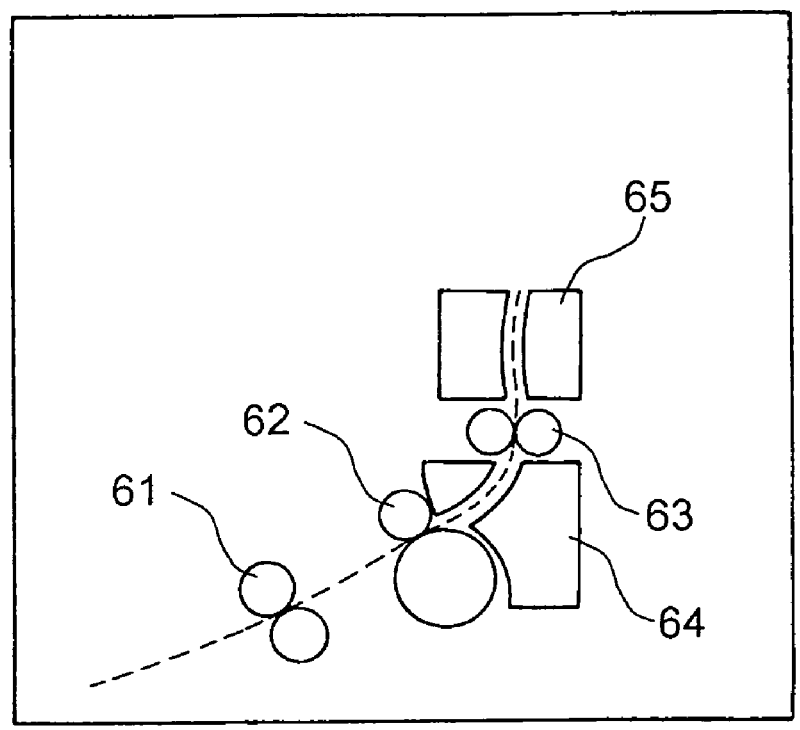
FIG. 8 is an illustration for explaining an example of a display screen on which a paper path has been input at step ST5 in FIG. 1.

FIG. 8 is an illustration showing an example of how a paper path is input at step ST5 in FIG. 1. The displayed path is constituted by elements in the form of a spline, an arc, and a straight line. A general paper path can be defined by connecting points near the middle of the transport guide pairs 64 and 65.

Figure 9:
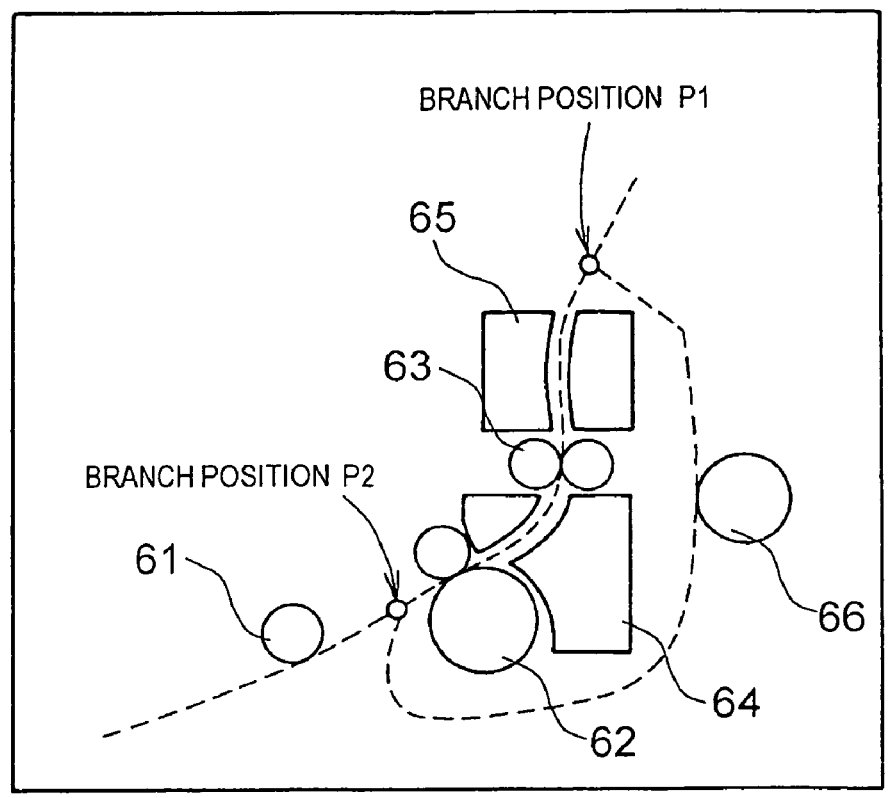
FIG. 9 is an illustration for explaining an example of a display screen on which branch points have been specified on the sectional view at step ST6 in FIG. 1.

FIG. 9 is an illustration for explaining an example of input of branch points on the sectional view.

Referring to FIG. 9, when there are special points P1 and P2 on the transport path such as branch points that appear on the sectional view as a result of formation of a closed loop to allow double-side copying, the points P1 and P2 are specified to divide the elements into sections.

Figure 10B:
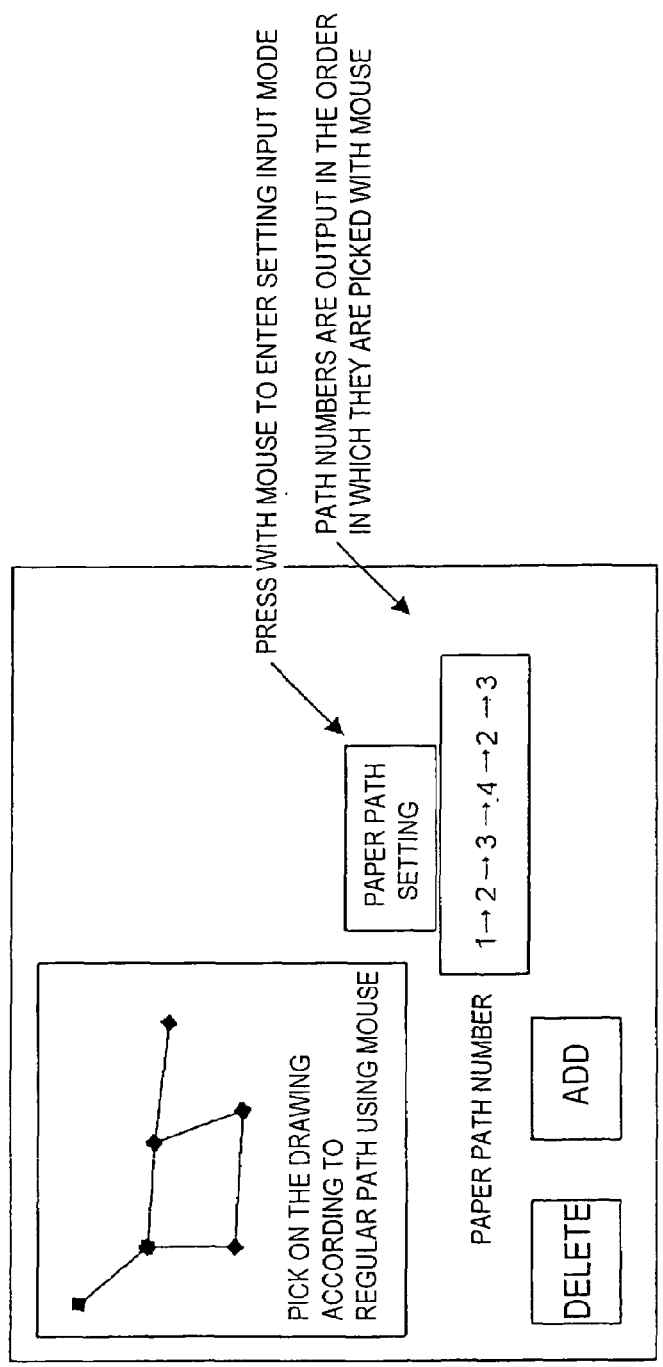
Figure 10C:
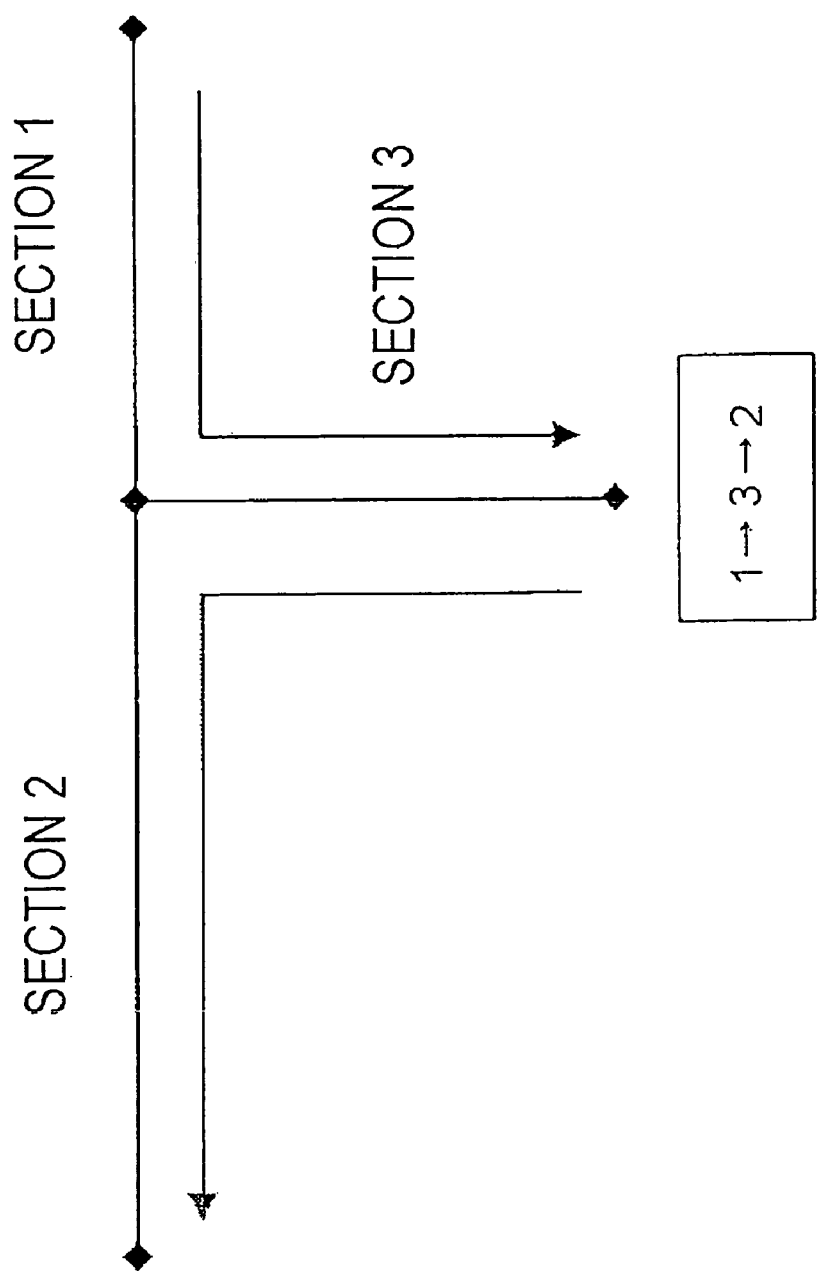

FIGS. 10A to 10C are illustrations for explaining an example of input of a regular paper path. FIG. 10A shows a process of specifying an order in which paper is to flow through the elements which have been divided into sections at step ST6 in FIG. 1.

When paper flows according to the arrows in the figure, a paper path setting button on a GUI for setting a paper path is pressed to pick paper sections according to the regular path. When picking is completed, an arrangement of element numbers that is in the order in which the paper passes through the elements can be checked on the screen (FIG. 10B). Further, the paper transport path can be schematically displayed (FIG. 10C).

Figure 11:
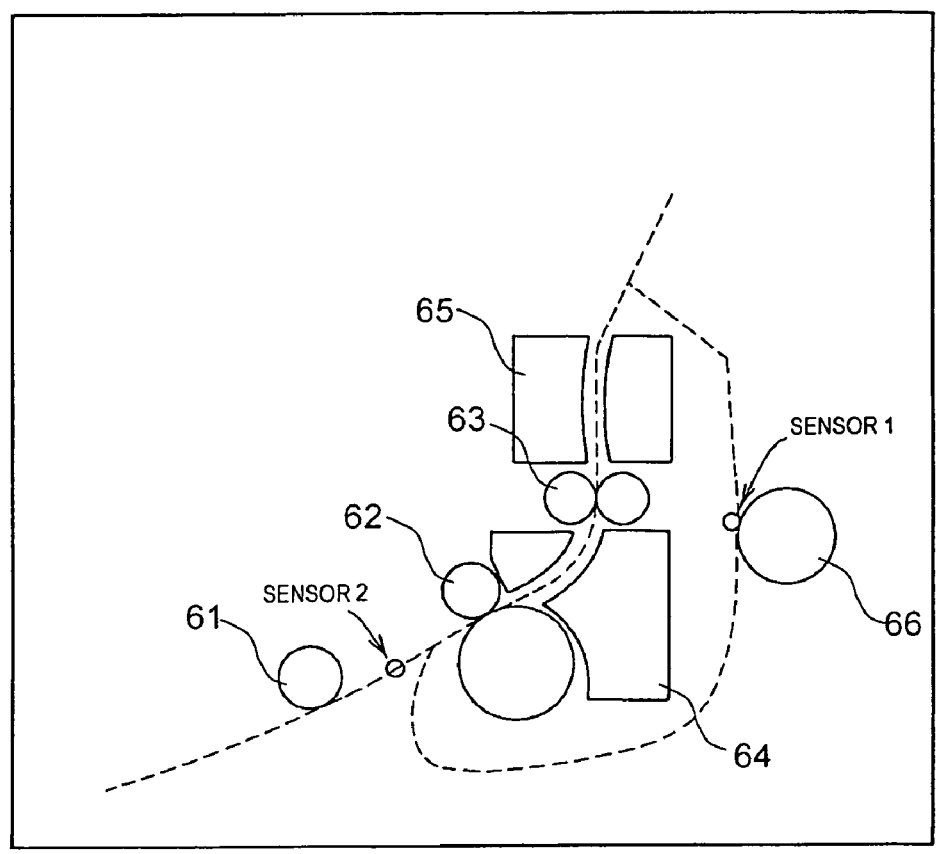
FIG. 11 is an illustration for explaining an example of a display screen after the position of a sensor is defined and input at step ST8 in FIG. 1.

FIG. 11 is an illustration for explaining an example of input of sensor positions. FIG. 11 shows how to specify sensor positions on the paper path defined through the steps up to ST6, at step ST8 in FIG. 1. The sensors may be picked on the paper path, and the values of coordinates to turn them on/off may be shown in the sectional view. At this time, the user may specify the choice of either local coordinates relative to the origin of the sectional view or global coordinates in the three-dimensional space.

(Details of Output Format Selection and Data Output)

Figure 12:
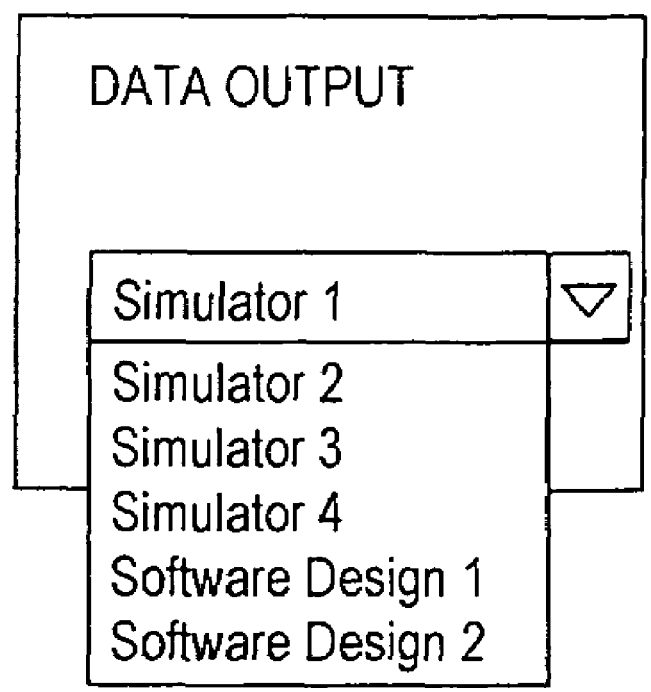
FIG. 12 is an illustration for explaining an example of a screen for selecting an output format at step ST9 in FIG. 1.

FIG. 12 is an illustration for explaining an example of selection of an output format. FIG. 12 shows how an output format is selected at step ST9 in FIG. 1. When a simulator or a design division is selected and an output button is pressed, information is output in a text file format according to an output flag of the attribute, and the information can be accurately passed to the relevant division in the form of electronic data.

FIG. 13 shows an example of a file format of output data. FIG. 13 shows an example of a format of a file output at step ST10 in FIG. 1 based on an output format thus selected. By creating an IF customized program for reading the file at various simulators, the parameters of the simulators can be automatically set to improve the efficiency of operations.

(Overall System Diagram)

Figure 14:
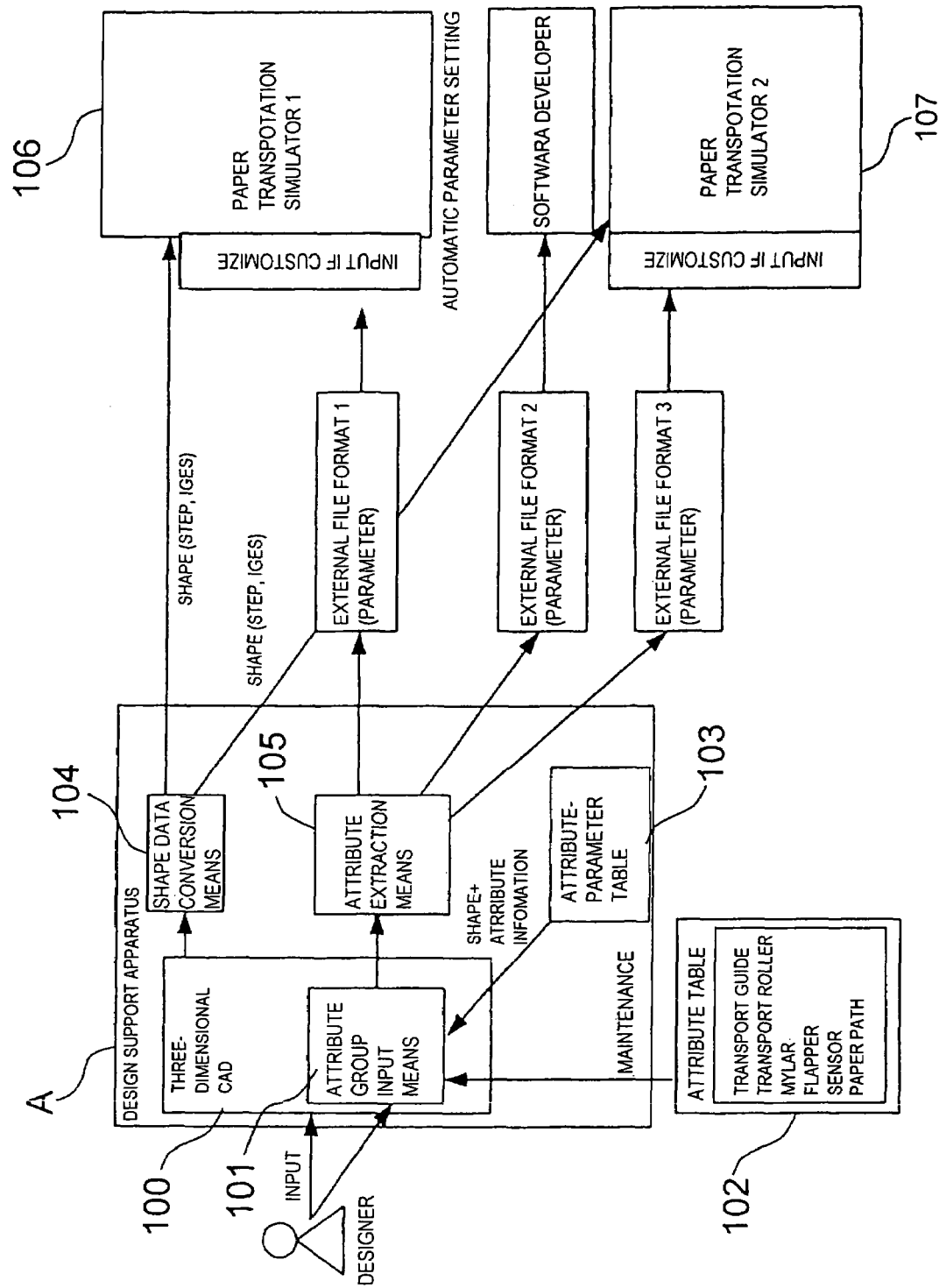
FIG. 14 is a schematic configuration diagram for explaining a flow of data in the system as a whole.

FIG. 14 is a schematic configuration diagram for explaining an example of a system as a whole in which the invention can be preferably implemented. A description will now be made on how a flow of data as described above is passed to a simulator with reference to a paper transportation design system as a whole.

An aided design apparatus A has three-dimensional CAD 100 to which shape data representing profiles of parts used in a transport system unit are input.

A designer sets attributes of each of the parts whose shape data have been input using attribute group input means 101.

In doing so, the input operation by the designer can be facilitated by providing attribute group reference means 102 in which required attribute groups are defined in advance. By adding attribute names associated with the attribute group of each part to the attribute group input means 101, data of various attribute names can be added to the shape data of each part.

When the shape data and attribute name data are output, those values can be easily output by making reference to an attribute name-parameter table (parameter calculation means) 103 in such a case that a frictional coefficient is decided when a material is decided.

The shape data are converted and output by data conversion means 104 in an intermediate data format that can be fetched by simulators 106 and 107. Since the simulators 106 and 107 that are output destinations use different attributes depending on the their types, attribute extraction means 105 extracts attribute names that are used by a selected output destination and converts and outputs the extracted attribute names in an external file format in accordance with an output format for the output destination. Data output means that is a combination of the data conversion means 104 and the attribute extraction means 105 may be provided.

A customized program may be developed depending on the simulators to provide the simulators with a function of fetching an external file to allow automatic parameter setting. A format for intermediate data to be used between the aided design apparatus and the simulators may be determined in advance to allow automatic setting in each simulator using an external file.

Further, referring to the linkage with a firmware header of a software developer, exchange of drawings can be shifted from exchange on the basis of paper to exchange in the form of electronic information. Required information can be read from a file and used for firmware development, and no error will occur in reading drawings.

By providing the aided design apparatus with the attribute names-parameter table, materials can be automatically associated with frictional coefficients, which allows a designer to reflect findings obtained through analysis on his or her designing activities in addition to the action of defining shapes and to distribute resultant shape and attribute values to various divisions concerned.

As discussed above, in the present embodiment, data of parts used in a simulation for paper transportation design can be easily exchanged.

In the present embodiment, in designing the paper transportation system unit on CAD, attribute group as a parameter to be necessary for simulation can be added to the shape data of each part or surface.

In the present embodiment, shape data and parameters (paper path, sensor position, and roller position) are simultaneously selected and outputted according to each simulation type.

When the aided design apparatus outputs a sectional view, the aided design apparatus selects and outputs only the shape data of parts and surfaces having attributes group (the guide plates and the rollers) concerning paper transportation system in the present embodiment,. That is, the aided design apparatus selects and outputs the shape data associated with parts and so on such as the roller, the transportation guide, and the sensor concerning paper transportation system.

In the present embodiment, when the mechanism of the paper transportation system is analyzed, the shape data with parameters (attribute group, attribute name) can be conveyed to various simulators and an indirect department under centralization of management on CAD. Therefore it is not necessary to input a parameter definition of a simulator into every system by hand, and their management becomes easy.

In the present embodiment, when a sectional view is made, it is not necessary to understand the complicated sectional view with displayed extra parts information because only parts with specified attribute group are projected on the sectional view. Therefore only information concerning the paper transportation unit can be understood instantly.

In the present embodiment, the part shapes and their parameters can be conveyed in the form of a text file to the department which has no three-dimensional CAD. Therefore only necessary information can be delivered smoothly and precisely.

In the present embodiment, when a simulator has the customized program for receiving the text file outputted from the paper transportation aided design apparatus, the work such as inputting shapes and parameters into simulator is saved. Therefore cooperation between the three-dimensional CAD and the simulator can be carried out smoothly.

In the present embodiment, an item of an attribute name added to a part can be added and defined. Therefore it is easily to increase the number of parameters according to the increase of simulators, and it is made possible to manage the data flexibly.

It is necessary to change color in correspondence with a pressure value if color represents pressure value of roller. Therefore it is imprecise, and unfit to use color information for exchange of parameters of simulator. However, in the present embodiment, when color information is included in attribute information, increase and decrease of number of parameters and change of value of parameter is performed simply. Therefore it is possible to manage the data flexibly and definitely.

In the present embodiment, when the aided design apparatus has a parameter data base, it is possible to exchange opinions about influence of behavior of paper by a shape change and a parameter change (e.g. material change of a guide plate) between a designer and an analysis department.

In the present embodiment, it is possible to manage the attribute data collectively on three-dimensional CAD without a management system such as PDM. In addition, when the exchange of data between the paper transportation aided design apparatus and the simulator is performed by using a predetermined text file, it is possible to convey part shapes and parameters to simulator precisely and immediately. As a result, it is possible to reduce the verification period of simulation.

What is claimed is:

1. An aided design apparatus comprising:
a three-dimensional shape input unit configured to input three-dimensional shape data of a part used for transportation of a sheet;
a converter configured to convert the three-dimensional shape data input by said three-dimensional shape input unit and data of an attribute name associated with an attribute group of the part to an output format that can be fetched by a simulator; and
data output means for outputting the data converted by said converter,
wherein the attribute group includes at least one of a transport guide, a transport roller, a polyester film, a flapper, a sensor, and a sheet transport path.

2. An aided design apparatus according to claim 1, comprising attribute group input means for inputting data of the attribute group of the part and the attribute name associated with the attribute group.

3. An aided design apparatus according to claim 1, wherein when the attribute group is a transport guide, the data of the attribute name associated therewith is a frictional coefficient.

4. An aided design apparatus according to claim 1, wherein when the attribute group is a transport roller, the data of the attribute name associated therewith includes at least one of a pressing force, a driving condition, a frictional coefficient, and an inertial force.

5. An aided design apparatus according to claim 1, wherein when the attribute group is a polyester film, the data of the attribute name associated therewith includes at least either of a Young's modulus and a frictional coefficient.

6. An aided design apparatus according to claim 1, wherein when the attribute group is a flapper, the data of the attribute name associated therewith is a driving condition.

7. An aided design apparatus according to claim 1, wherein when the attribute group is a sensor, the data of the attribute name associated therewith is a driving condition.

8. An aided design apparatus according to claim 1, wherein when the attribute group is a sheet transport path, the data of the attribute name associated therewith is a path length of the sheet transport path.

9. An aided design apparatus according to claim 1, comprising sectional view creating means for creating a sectional view by specifying a principal section based on the three-dimensional shape data of the part and the data of the attribute name associated with the attribute group.

10. An aided design apparatus according to claim 9, comprising means for inputting at least one of the sheet transport path, a branch position of the sheet transport path, an order of the sheet transport path, and a position of a sensor on the sheet transport path in the sectional view created by the sectional view creating means.

11. An aided design apparatus according to claim 1, comprising attribute extraction means for extracting the data of the attribute name used at a destination of output.

12. An aided design apparatus according to claim 11, wherein said converter converts the output format of the data of the attribute name to be output to the destination of output such that it matches the data of the attribute name at the destination of output extracted by the attribute extraction means.

13. An aided design apparatus according to claim 1, comprising reading means for reading a file in which the attribute group of the part, the data of the attribute name, and the destination of output are defined as items.

14. An aided design apparatus according to claim 13, comprising correction means for making addition, deletion, and correction on each of the items defined in the file read by the reading means or a parameter of equal value.

15. An aided design apparatus according to claim 1, comprising parameter calculation means for automatically determining parameters of other attribute names by selecting a value for the data of the attribute name associated with the attribute group with the attribute group input means.

16. An aided design method comprising the steps of:
  inputting three-dimensional shape data of a pad used for transporting a sheet;
  converting the three-dimensional shape data and data of an attribute group of the part and an attribute name associated with the attribute group of the part to an output format that can be fetched by a simulator; and outputting the converted data,
  wherein the attribute group includes at least one of a transport guide, a transport roller, a polyester film, a flapper, a sensor, and a sheet transport path.

17. An aided design method according to claim 16, comprising the step of creating a sectional view by specifying a principal section based on the three-dimensional shape data of the part and the data of the attribute name associated with the attribute group.

18. An aided design method according to claim 17, comprising the step of inputting at least one of the sheet transport path, a branch position of the sheet transport path, an order of the sheet transport path, and a position of a sensor on the sheet transport path in the sectional view created at the sectional view creating step.

19. An aided design method according to claim 17, comprising the step of selecting an output destination to which data of the sectional view, the three-dimensional shape data of the part, and the data of the attribute name are to be an output.

20. An aided design method according to claim 19, comprising the step of automatically selecting an item to be outputted according to the destination of output selected at the step of selecting the output destination and outputting the value of the selected item to be an output in a text file format.

21. A recording medium having a program recorded therein, the program causing an aided design apparatus to execute the steps of:
  inputting three-dimensional shape data of a part used for transporting a sheet;
  converting the three-dimensional shape data and data of an attribute group at the part and an attribute name associated with the attribute group of the part to an output format that can be fetched by a simulator;
  and outputting the converted data,
  wherein the attribute group includes at least one of a transport guide, a transport roller, a polyester film, a flapper, a sensor, and a sheet transport path.

* * * * *